April 27, 1948.                 B. RONAY ET AL                 2,440,298
             METHOD OF BRAZING STEEL SHAFT AND FLANGE ASSEMBLIES
                             Filed July 18, 1944
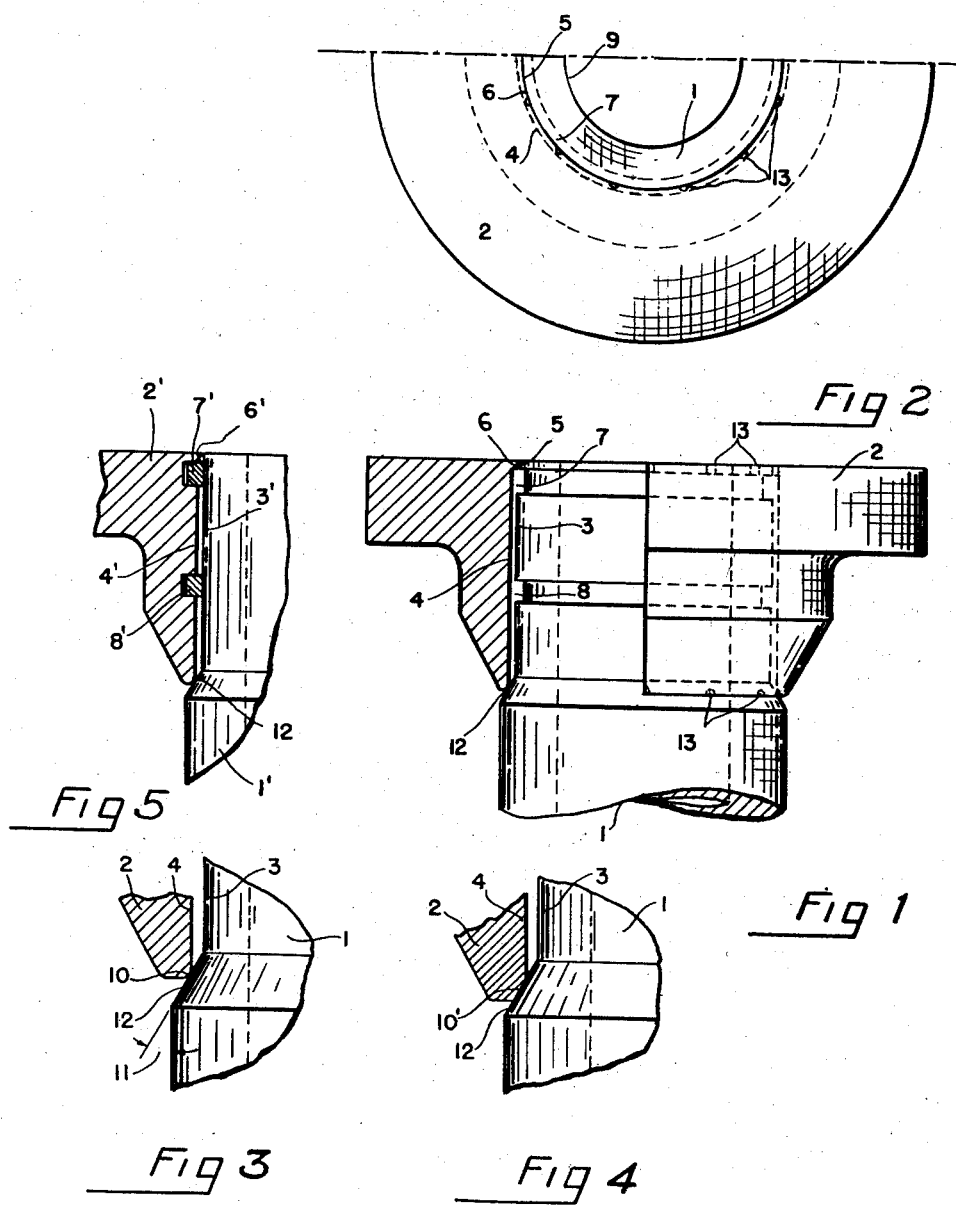
INVENTOR
BELA RONAY & CYRIL D. JENSEN
BY
ATTORNEY Patented Apr. 27, 1948

2,440,298

UNITED STATES PATENT OFFICE 2,440,298

METHOD OF BRAZING STEEL SHAFT AND FLANGE ASSEMBLIES

Bela Ronay and Cyril D. Jensen, Annapolis, Md.

Application July 18, 1944, Serial No. 545,526

8 Claims. (Cl. 113—112)

(Granted under the act of March 3, 1883, as amended April 30, 1928; 370 O. G. 757)

This invention relates to a new manner of brazing shaft assemblies together so as to produce concentric alignment between the parts in the finished assembly in a simple manner and to produce a strong and continuous joint with an even distribution of the flux.

The new process is particularly used in adapting silver-brazing to affixing steel flanges on steel shafts.

Affixing flanges, particularly of bronze, to copper or brass tubing or pipe by means of silver-brazing has been an acknowledged industrial art for several years past.

The type of piping in which the silver-brazed flanged assemblies are installed is regarded as being primarily under static loading. Under such conditions the requirements for the silver-brazed joints are sufficient coverage to provide a shear strength thereof that is greater than the working stress through the joint and continuity in the joint to assure that there is no leakage through the connection. For joints of the above given type, it is immaterial whether or not the tube is concentric with the bore of the flange, so long as the joint possesses the required shear strength and is tight.

Assembling bronze flange and copper or brass tube or pipe assemblies does not represent unusual difficulties in that owing to the favorable relationship between the shear value of the silver-brazed joint and the tensile strength of the copper or brass tubing, the depth of the joint can be rather shallow, so that the tube can be inserted regardless of the close clearance, without injury to the flux coating. As mentioned above, usually no attention is paid, on insertion of the tube, whether or not it is concentric with the bore of the flange. In order to facilitate the work of assembling it is the usual practice to set the pipe in the horizontal position and support it in such manner that the flange can be slipped on the free end thereof where it settles and naturally assumes an eccentric position relative to the tube.

The load transmitted through a steel shaft, solid or tubular, is naturally very considerably larger than that which is imposed axially on a copper or brass tube of comparable diameter. Therefore, the joint area for a steel shaft assembled to the flange by silver-brazing is likewise larger in proportion than that which is required for affixing a bronze flange to a copper tube. For example, the width of the silver-brazed joint necessary in bronze flange-copper tube assembly of a 6" I. P. S. tube is 1%4" while that for a 6" diameter shaft loaded to the full capacity thereof is a minimum of 5".

From the foregoing it is evident that assembling a steel flange and shaft for silver-brazing of a size given above or larger calls for far more skilled manipulation by reason of the length of the joint, if the flux coating is to be retained uninjured on completion of the assembly. In addition, since shafts are dynamically loaded and the strength or shear value of the brazing alloy varies inversely with the thickness thereof, it is mandatory to obtain not only near 100% coverage but also to maintain concentricity between the male and female members of the joint. Primarily, however, concentricity between the two members of the joint is mandatory for flange and shaft assemblies in order to permit dynamic balance essential for high speed, high inertia type prime movers.

Accordingly, the main objects of this process of adapting silver-brazing to the affixing of flanges to shafts are:

(a) To facilitate assembling without injuring the flux coating on either member of the joint, and (b) To maintain the concentricity obtained in assembling during the heating operation and in the completed joint.

Other and more specific objects will appear as the description of this process proceeds in detail with reference to the accompanying drawing, wherein:

Fig. 1 shows the assembly of a flange and shaft partly in section, prepared for the brazing operation in accordance with the present invention, Fig. 2 is a top view thereof, Fig. 3 is an enlarged detail view of a modification, Fig. 4 is a similar enlarged detail view of another modification, and Fig. 5 is a partial view showing a modification in which the grooves for the introduction of the silver-brazing compound are preferably located in the female member.

Fig. 1 shows the preparation of the members 1 and 2 which permits a 0.006" to 0.008" clearance within the intended joint area between the surfaces 3 and 4. The extreme outer end of the male member 1 is turned to form a land 5 whose diameter is very slightly greater than that of the corresponding bore 6 of the flange to provide a press fit at this point, or it may be a few thousandths of an inch larger than the corresponding bore 6 of the corresponding end of the flange, thus necessitating shrinking on of the latter. In either case, the result is a positive concentric placement of the outer ends of the elements with respect to each other.

The inner end of the joint zone terminates in a taper 12 which serves as an automatic guide as the flange is lowered onto the land, and retains the flange 2 in its proper location as it cools, without outside support. This taper may have an angle 11 of approximately 10°.

The requirement for shrink fit indicates that the flange has to be preheated whereby the entire bore is enlarged, thus providing temporarily a larger clearance than the specified 0.006" to 0.008", which further aids in maintaining the annular clearance between the two members assembled until the bottom of the flange is seated on the tapered portion 12 of the shaft and automatically corrects, together with the guiding by the top land, the proper positioning of the two members 1 and 2 in regard to axial alignment. In addition, the enlarged clearance and the true guiding reduces the danger of scraping off the flux.

From the above it is evident that the best results are obtained when the assembling is performed with the shaft in the upright position with the end prepared to receive the flange pointing upward as shown in Fig. 1. Assembling in the horizontal is likewise possible; however, it requires considerable jigging to yield comparable results. As indicated in the drawing, the female member contains several shallow notches 13 at the top and bottom lands which serve as vents during heating to permit free escape of the gases liberated by the melting silver-brazing compound. The drawing further shows that the silver-brazing compound may be introduced in grooves machined preferably in the female member, as shown at 7' and 8' in Fig. 5. However, they may be in the male member as shown at 7 and 8 in Fig. 1.

Although the shaft shown is hollow this process may be applied likewise to solid shafts. Most shaft and flange assemblies will be of steel construction, but this process is adaptable to constructions of other metals and is not to be construed as being limited to steel. One or both members may be of some other material.

Various modification in the process may be used without departing from the spirit of this invention. For example, the lower end of the flange member may have a curvature such as indicated at 10 in Fig. 3, or a bevel such as shown at 10' in Fig. 4, so as to get a more extensive or closer approximation between the surfaces at the line of contact.

In Fig. 5, the clearance between surfaces 3' and 4' is similar to that between 3 and 4 in Fig. 1, but the grooves for introducing the silver-brazing compound are provided in the female member at 7' and 8', and the shrink fit at the outer end of the assembly may be provided between the surfaces 3' and a land 6'. The vent notches (not shown) may be in the land 6' of the female member or in the surface 3'.

It is therefore seen that the essential feature of the present improvement in the brazing of shaft assemblies is the preparation of the male and female members whereby proper alignment and clearances are provided for assembling the members without injury to the flux coating and for maintaining a proper and even clearance all around the members during the brazing operation between the surfaces being brazed together. As is well known in the art, the brazing alloy which is introduced in the grooves, in strips usually, will flow at the proper temperature into the clearance between the surfaces being brazed, by capillary attraction and will bind into a continuous mass with the metals in these surfaces only if the clearance is sufficiently small and the flux has not been scraped off during assembly. The binding is not so good in places where the clearance is too great. The present improvement therefore plays an important part in the proper brazing of shaft assemblies where maximum strength is essential.

The scope of this invention is defined by the appended claims.

The invention described herein may be manufactured and used by or for the Government of the United States of America for governmental purposes without the payment of any royalties thereon or therefor.

What is claimed is:

1. In a method for joining male and female shaft elements, forming a tapered guide on the male element at the inner end of the joint for contact with one end of the female element; providing a closely interfitting zone for said elements at the other end of the female element in the form of complemental surfaces parallel to the axis of the joint; providing a capillary clearance space all the way from said guide to said zone, interrupted by at least one cavity for reception of a brazing material; introducing the brazing material to said cavity; supplying a flux to at least one of the surfaces that form said clearance space; and causing the female element to exert radially compressive forces on the male element at said surfaces of said zone and heating the brazing material to cause it to flow into said capillary clearance space.

2. In a method of brazing male and female shaft members, turning down the end of the male member for the length of the joint and forming a taper between this turned down area and the area having the original diameter of the member, turning the bore of the female member, except for a land at its outer end, to a diameter smaller than the original diameter of the male member but sufficiently large to form a proper brazing clearance between the members when assembled, turning the land to a diameter slightly less than that of the turned down area of the male member so as to provide a shrink fit therebetween, cutting grooves in one of the members for insertion of the brazing alloy, inserting the alloy, painting the surfaces to be brazed with flux, heating the female member to enlarge its bore to enable assembly of the members without scraping off the flux coating, and assembling the members carefully to avoid scraping off any flux coating, bringing the inner edge of the female member bore against the taper, and the land over the end of the male member.

3. In a method of brazing male and female shaft members, turning down the end of the male member for the length of the joint and forming a taper between this turned down area and the area having the original diameter of the member, turning the bore of the female member, except for a land at its outer end, to a diameter smaller than the original diameter of the male member but sufficiently large to form a proper brazing clearance between the members when assembled, turning the land to a diameter slightly less than that of the turned down area of the male member so as to provide a force fit therebetween, cutting grooves in one of the members for insertion of the brazing alloy, inserting the alloy, painting the surfaces to be brazed with flux, and assembling the members carefully to avoid scraping off any flux coating, bringing the inner edge of the female member bore against the taper, and forcing the land over the end of the male member.

4. In a method of brazing shaft assemblies, forming male and female members with an annular clearance therebetween extending over a sufficient length to furnish the required strength, with a taper on the male member at the end of the joint against which the inner end of the female member is to rest when assembled and a land on the outer end of one or both members to bring them together in a shrink fit, introducing the brazing alloy in grooves formed in any known manner in the joint, applying a flux coating, heating the female member to enable assembly, and assembling the members carefully to avoid scraping off the flux coating so as to bring the inner end of the female member against the taper, and the outer ends of both members tightly together, thus maintaining alignment of the shaft elements and an even and proper brazing clearance between the members during the brazing operation.

5. In a method of brazing shaft assemblies, forming male and female members with an annular clearance therebetween extending over a sufficient length to furnish the required strength, with a taper on the male member at the end of the joint against which the inner end of the female member is to rest when assembled and a land on the outer end of one or both members to bring them together in a force fit, introducing the brazing alloy in grooves formed in any known manner in the joint, applying a flux coating, and assembling the members carefully to avoid scraping off the flux coating so as to bring the inner end of the female member against the taper, and the outer ends of both members tightly together, thus maintaining alignment of the shaft elements and an even and proper brazing clearance between the members during the brazing operation.

6. In a method of brazing shaft assemblies, forming male and female members with an annular clearance therebetween extending over a sufficient length to furnish the required strength, with a taper on the male member at the end of the joint against which the inner end of the female member is to rest when assembled and a land on the outer end of one or both members to bring them together in a shrink fit, making vent notches in the land or lands for the escape of gases from the melting brazing alloy, introducing the brazing alloy in grooves formed in any known manner in the joint, applying a flux coating, heating the female member to enable assembly, and assembling the members carefully to avoid scraping off the flux coating so as to bring the inner end of the female member against the taper, and the outer ends of both members tightly together, thus maintaining alignment of the shaft elements and an even and proper brazing clearance between the members during the brazing operation.

7. In a method of brazing shaft assemblies, forming male and female members with an annular clearance therebetween extending over a sufficient length to furnish the required strength, with a taper on the male member at the end of the joint against which the inner end of the female member is to rest when assembled, and a land on the outer end of one or both members to bring them together in a shrink fit, rounding off the inner end of the female member, introducing the brazing alloy in grooves formed in any known manner in the joint, applying a flux coating, heating the female member to enable assembly, and assembling the members carefully to avoid scraping off the flux coating so as to bring the inner end of the female member against the taper, and the outer ends of both members tightly together, thus maintaining alignment of the shaft elements and an even and proper brazing clearance between the members during the brazing operation.

8. In a method of brazing shaft assemblies, forming male and female members with an annular clearance therebetween extending over a sufficient length to furnish the required strength, with a taper on the male member at the end of the joint against which the inner end of the female member is to rest when assembled, and a land on the outer end of one or both members to bring them together in a shrink fit, bevelling off the inner end of the female member at an angle substantially equal to that of the taper on the male member, introducing the brazing alloy in grooves formed in any known manner in the joint, applying a flux coating, heating the female member to enable assembly, and assembling the members carefully to avoid scraping off the flux coating so as to bring the inner end of the female member against the taper, and the outer ends of both members tightly together, thus maintaining alignment of the shaft elements and an even and proper brazing clearance between the members during the brazing operation.

BELA RONAY.
CYRIL D. JENSEN.

REFERENCES CITED

The following references are of record in the file of this patent:

UNITED STATES PATENTS

| Number | Name | Date |
| --- | --- | --- |
| 1,845,901 | Bassler | Feb. 16, 1932 |
| 1,901,820 | Parker | Mar. 14, 1933 |
| 2,040,092 | Leedy | May 12, 1936 |
| 2,050,728 | Ost | Aug. 11, 1936 |
| 2,094,495 | Robinson et al. | Sept. 28, 1937 |
| 2,334,755 | Eglinton | Nov. 23, 1943 |